July 2, 1935.  E. R. EVANS ET AL  2,006,634
EMERGENCY SLACK TAKE-UP DEVICE
Filed April 23, 1932    3 Sheets-Sheet 2
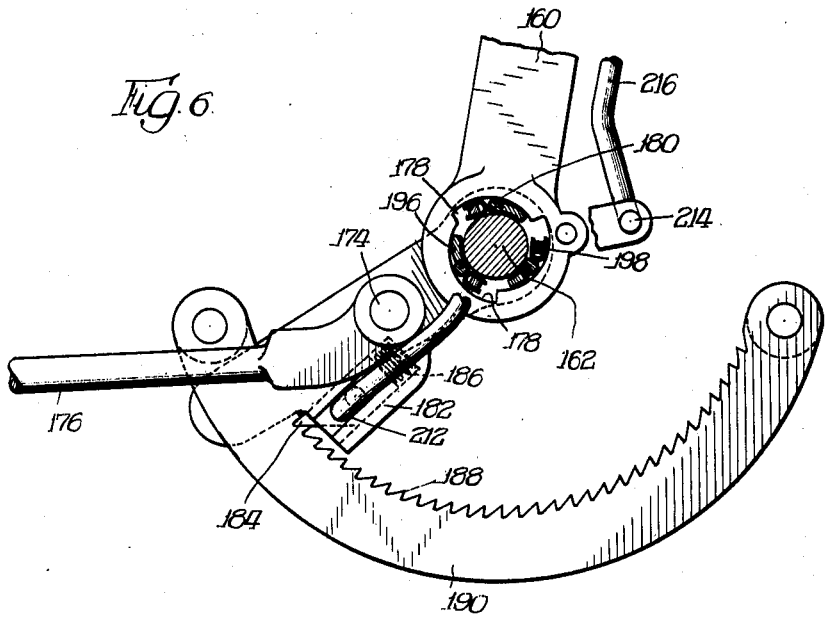
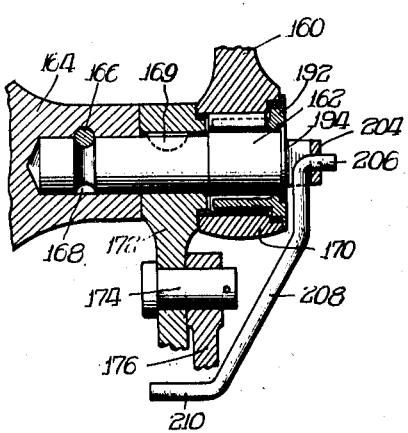
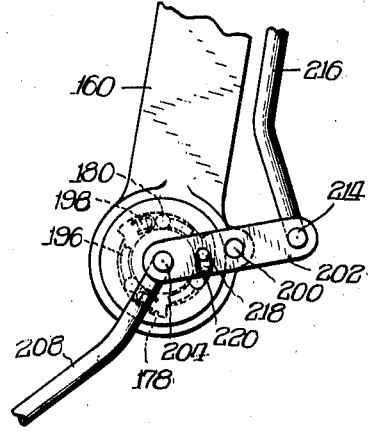
Inventors:
Edwin R. Evans,
Edward A. Rockwell,

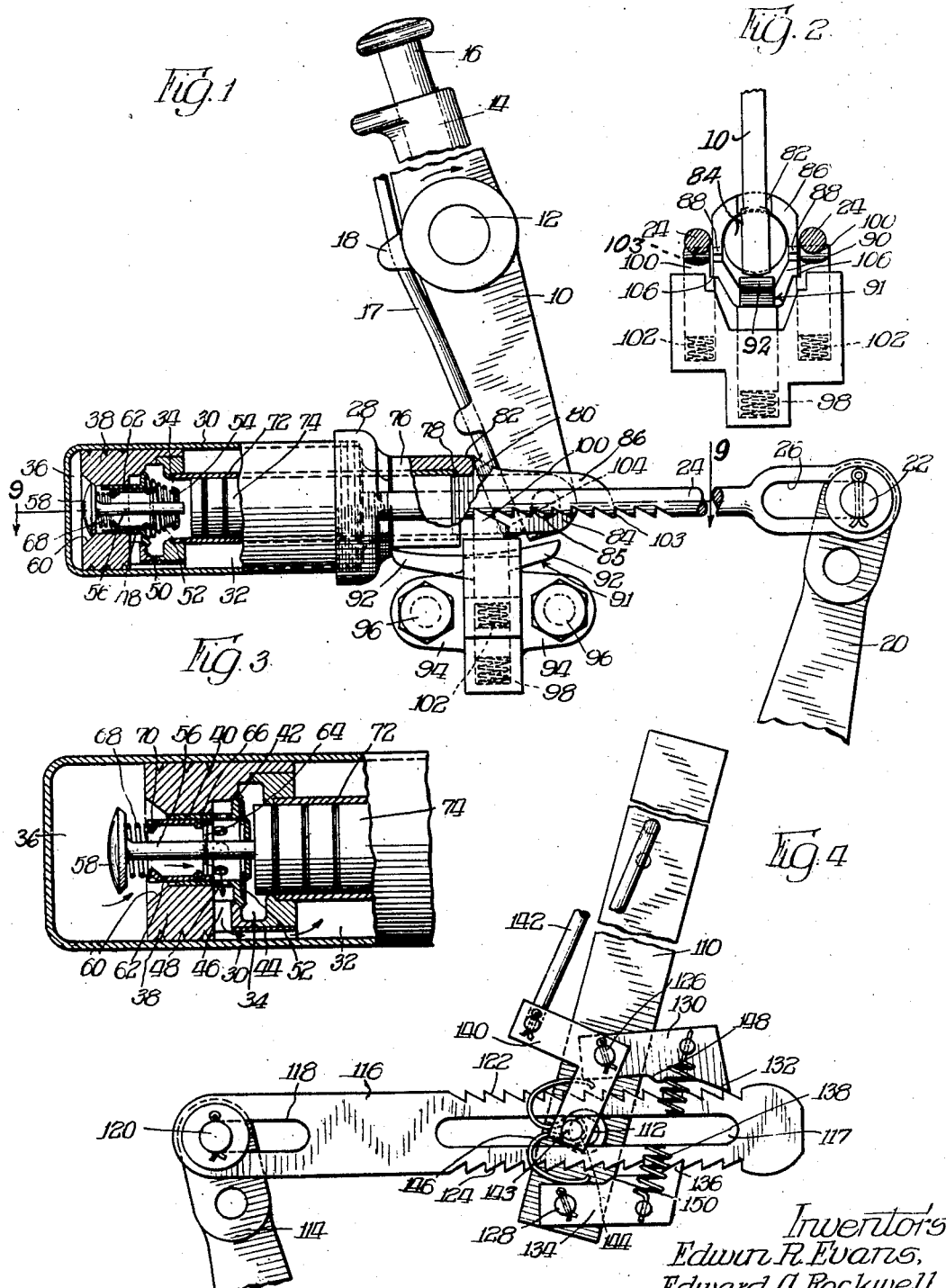

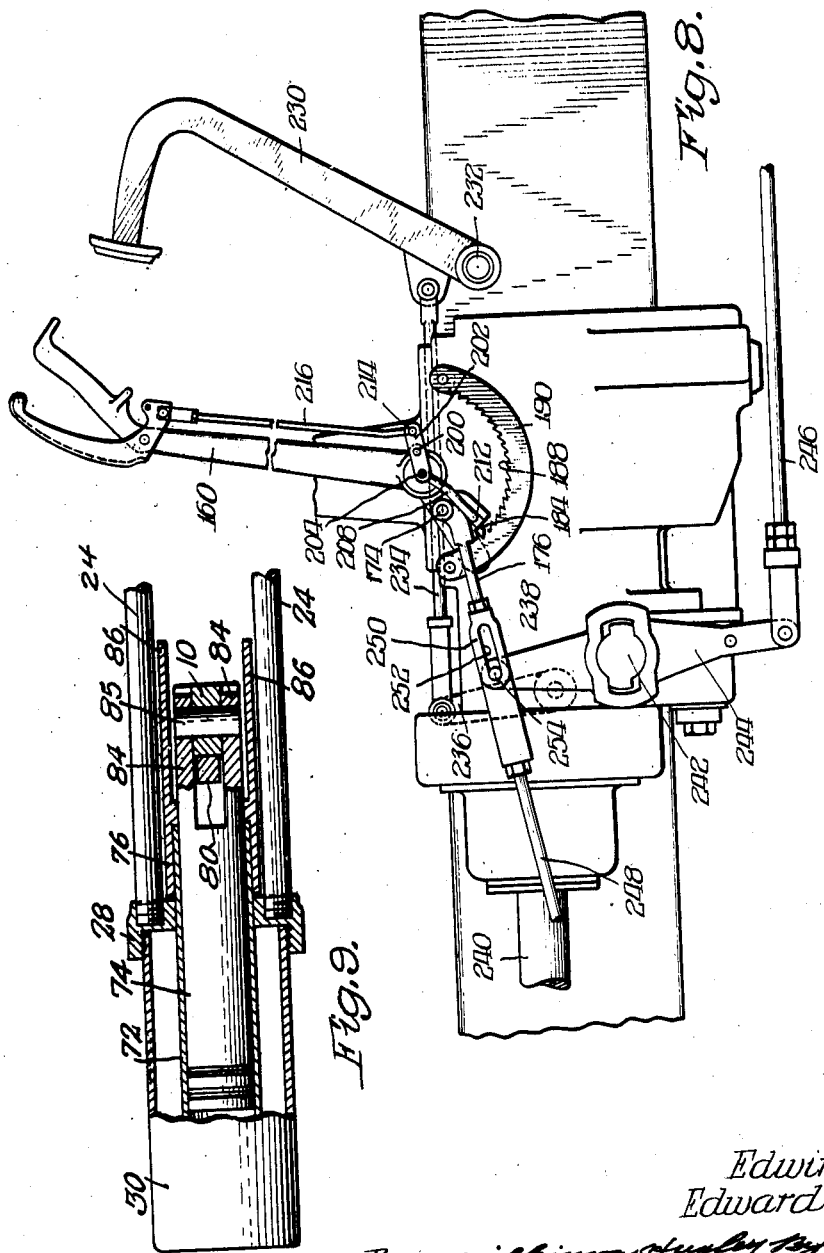

Patented July 2, 1935

2,006,634

UNITED STATES PATENT OFFICE 2,006,634

EMERGENCY SLACK TAKE-UP DEVICE

Edwin R. Evans and Edward A. Rockwell, Chicago, Ill.

Application April 23, 1932, Serial No. 607,039

18 Claims. (Cl. 188—196)

The present invention relates to emergency lever slack take-up devices for applying the wheel brakes of a motor vehicle.

With the development of power brake systems particularly those including mechanical power brakes in which the pedal travel remains substantially the same independent of wear of the wheel brake linings, it is necessary to employ some means for insuring that the emergency lever is always effective to apply the wheel brakes in spite of considerable wear of the brake linings. In our application, Serial No. 571,050, filed October 26, 1931, we have disclosed a slack take-up link between the brake lever which is actuated by the power brake and the emergency lever whereby, when the brakes are applied through operation of the power brake and the brake linkage moved to a sufficient extent, the slack take-up link will move to take up the slack in the linkage between the emergency lever and the brake lever. Therefore in this system the slack in the emergency lever control linkage is automatically taken up after a certain amount of wear of the brake linings and the emergency lever is always available for fully applying the wheel brakes.

It is an object of the present invention to provide an emergency lever slack take-up device which may be manually operated through back and forth movement of the emergency lever in order to take up all the slack in the linkage and fully apply the wheel brakes.

It is further an object of the invention to employ pawl and ratchet means for holding the linkage against retractive movement while the emergency lever is being operated for applying the brakes and to associate with the emergency lever, mechanism for releasing the pawl and ratchet means to permit release of the wheel brakes.

Further and additional objects and advantages of the present invention will be more readily apparent from the following description taken in connection with the attached drawings, in which Figure 1 is a side elevation partially in section of an emergency slack take-up device in released position;

Figure 2 is a detail section of a portion of the device shown in Figure 1;

Figure 3 is an enlarged section of the cylinder and piston in Figure 1 showing the parts in releasing position;

Figure 4 is a side elevation of a modified arrangement;

Figure 5 is a side elevation of a further modification;

Figure 6 is an elevation partially in section of the device shown in Figure 5;

Figure 7 is a detail section of the device shown in Figure 5;

Figure 8 is a side elevation of a power brake unit showing the emergency lever and slack take-up device of Figure 6, and Figure 9 is a plan view partially in section of the structure shown in Figure 1.

In Figures 1, 2 and 3 there is shown an arrangement including an emergency brake lever 10 carried by pivot pin 12 and having a handle 14. The handle carries a movable button 16 for operating a release rod 17 which is guided for reciprocable movement by an enlargement 18 on the hub of the lever 10. The lever 20 may be the usual brake lever in the brake linkage of the motor vehicle which is suitably connected to the wheel brakes of the vehicle and during normal braking is operated by the brake pedal of the vehicle and preferably through a power brake. The lever 20 at its upper end carries a pivot pin 22 forming a pivotal connection for a pair of rods 24—24 having slotted ends 26 for engaging the pivot pin 22. The slotted ends 26 permit movement of the brake lever 20 during normal braking of the vehicle without movement of the rods 24.

At their left-hand ends, the rods 24 are threaded into a cylinder head member 28 which has secured thereto a fluid cylinder 30 having a fluid reservoir chamber 32, a pumping chamber 34 and a pressure chamber 36. A piston 38 is slidable within the cylinder 30 and forms a movable wall of the pressure chamber 36. The piston 38 has mounted therein a sleeve 40 carrying at its inner end a valve disk member 42 for controlling the flow of fluid from the reservoir chamber 32 through the valve passages 44 and 46 into the pumping chamber 34. The sleeve 40 has a plurality of openings 48 for a purpose to be later described.

The valve disk 42 together with the sleeve 40 is moved to normal seated position upon the valve seat 50 which is rigid with the piston 38 by a spiral spring 52 which reacts at its right-hand end against an abutment 54 secured to the end of a valve stem 56. The valve stem 56 carries at its left-hand end a valve member 58 adapted to cooperate with a valve seat 60 formed on the piston 38. Slidable within the sleeve 40 is a second sleeve 62 which, in normal released position, covers the openings 48 in the sleeve 40. The valve stem 56 carries a pin 64 adapted to engage projections 66 formed on the sleeve 62. The sleeve 62 is pressed for movement in a right-hand direction by a spring 68 between lugs 70 at the left-hand end of sleeve 62 and the inner surface of the valve 58. The piston 38 is secured to a tubular member 72 which has reciprocable therein a piston 74 forming a movable wall of the pumping chamber 34. The cylinder head 28 together with the cylinder 30 is normally held against an abutment member 76 which receives the right-hand end of the tubular member 72 and forms an abutment therefor through a shoulder 78.

The release rod 17 carried by the emergency lever 10 has a projection 80 at its lower end adapted to engage a contact face 82 formed on the member 76. The piston 74 which extends through the member 76 has a yoke-shaped right-hand end 84 secured by pin 85 to the lower end of lever 10. A yoke-shaped extension 86 from abutment 76 has on opposite sides ratchet teeth 88 adapted to be engaged by the arms 90 of a U-shaped pawl 91 having wing-shaped extensions 92. The pawl 91 is mounted in a bracket 94 fixedly secured by bolts 96 to some fixed part of the chassis frame of the vehicle. The bracket 94 contains therein a spring 98 normally urging the pawl 91 in an upward direction. The bracket 94 also serves to mount a pair of pawls 100 on each side thereof, upwardly pressed by springs 102. The pawls 100 are adapted to engage ratchet teeth 103 on the underside of rods 24. The ratchet teeth 103 on rods 104 are formed similar in shape to the ratchet teeth 88 on the yoke-shaped extension 86 from the abutment 76.

When it is desired to apply the brakes through movement of the emergency lever 10, the lever is pulled back by the handle 14 and rotates in a clockwise direction about the axis of pivot pin 12. The engagement of projection 80 with abutment face 82 of member 76 serves to move the member 76 in a left-hand direction and the arms 90 of pawl 91 will successively engage the ratchet teeth 88 upon the yoke-shaped extension 86 of the member 76 to hold the member 76 against return movement. At the same time the cylinder head 28, together with cylinder 30 will be moved in a left-hand direction by the member 76 thereby moving the rods 24 and actuating the brake lever 20. The pawls 100 will successively engage the ratchet teeth on the rods 24 and prevent return movement. If the full movement of the lever 10 is insufficient to fully apply the wheel brakes, the lever is pushed back towards its original position thereby rotating in a counter-clockwise direction about the axis of pivot pin 12. During this movement of the lever 10 the member 76 and the cylinder 30 will remain in positions to which they have been moved, since they are locked by the pawl members 91 and 100, but the movement of the lever 10 will move the piston 74 in a right-hand direction relative to the cylinder 72, thereby drawing fluid from the reservoir 32 into the pumping chamber 34 by opening inlet valve 42. The lever 10 is again moved in the opposite direction and movement of the piston 74 in a left-hand direction will discharge the fluid from pumping chamber 34 into the pressure chamber 36 by opening valve 58. It will be quite obvious that successive reciprocations of the lever 10 will build up a fluid pressure in chamber 36 and the fluid pressure will finally become sufficient to move the cylinder 30 together with cylinder head 28 and rods 24 in a left-hand direction while the piston 38, tubular member 72 and the abutment member 76 remain in stationary positions. Thus the brake lever will be moved sufficiently to fully apply the wheel brakes by the hydraulic pressure which has been built up.

When it is desired to release the brakes, the button 16 is pushed downwardly and at the same time the operator pulls back on lever 10. The projection 80 on rod 17 will disengage from abutment 82 and the movement of lever 10 in a clockwise direction about its pivot 12 will then be sufficient to bring the piston 74 into engagement with the end of the valve stem 56 and, as shown in Figure 3, will move the valve stem 56 sufficient to permit fluid to flow back from the pressure chamber. At the same time pin 64 on valve stem 56 moves the sleeve 62 and the openings 48 in sleeve 40 will be uncovered to permit the fluid to return to the reservoir 32. In Figure 3 the spring 52 is shown as entirely compressed. The downward movement of rod 17 will also cause the lower end 104 thereof to engage the arm 92 of pawl 91 and move it to released position. The release of pawl 91 will also cause release of the pawls 100 since the arms 90 engage shoulders 106 formed on the pawls 100, as shown in Figure 2. With the lever 10 pulled back in a clockwise direction about its pivot to cause opening of the valve 58 as in Figure 3 the fluid may return from the pressure chamber 36 to the reservoir 32. As the fluid pressure is relieved the cylinder 30 together with the rods 24 will move in a right-hand direction and permit release of the slack taken up in the brake linkage. After the cylinder 30 has moved into engagement with the abutment 76, all the slack taken up has been released. Thereupon, by pushing back the lever 10 to its full released position, as in Figure 1, the abutment 76 together with the cylinder 30 moves in a right-hand direction to fully release the brake linkage to the extent of the normal travel of the lever 10. The linkage will therefore return to its normal inoperative position as the lever 10 is allowed to return to its normal position and finally the pressure upon button 16 is released thereby returning the rod 17 to its normal position with the projection 80 engaging with the abutment 82 on member 76. The construction is such that if the normal movement of the lever 10 in a clockwise direction about the pivot 12 is insufficient to fully apply the brakes, the operator may, by moving the lever 10 in a back-and-forth direction, take up sufficient slack to bring about a full application of the wheel brakes.

A modification of the emergency slack take-up device is illustrated in Figure 4. In this arrangement the emergency lever 110 carried by pivot 112 actuates a brake lever 114 through a connecting link 116, which has a slotted opening 118 receiving pivot pin 120 carried by the brake lever 114. The link 116 also has a slotted opening 117 receiving and slidably supporting the link on the pivot pin 112. The connecting link 116 has ratchet teeth 122 on its upper side and ratchet teeth 124 on its lower side. The lever 110 carries pivots 126 and 128 above and below the connecting link 116. A pawl member 130 is carried by pivot 126 and has a tooth-shaped end 132 for engaging the ratchet teeth 122. A similar pawl member 134, having a tooth-shaped end 136 is carried by pivot 128. The pawl members are urged into engagement with the ratchet teeth 122—124 by a tension spring 138 connecting the ends of the pawl members.

A bell crank lever 140 is carried by pivot 126 and is operated by a rod 142. The depending arm of the bell crank lever 140 carries a pin 143 which engages the loop portion 144 of a leaf spring member 146, the ends of which are bent to bear against the pawl members 130—134 adjacent the pivots 126—128 therefor. It will be understood however that operation of the rod 142 will move the bell crank lever 140 in a manner to move the spring 146 in a right-hand direction so that the ends of the spring 146 bear against the lug portions 148 and 150 of the pawl members, in which position the spring 146 will oppose the effect of the tension spring 138 and tend to separate the pawl members.

In operation of the device illustrated in Figure 4, reciprocation of the lever 110 will progressively move the connecting link 116 in a manner to operate the brake lever 114. Thus movement of the lever 110 in a counter-clockwise direction about the pivot 112 from the position shown in Figure 4 will move the link 116 through the action of pawl 134. If the initial movement of lever 110 is insufficient to fully apply the brakes it is pushed back in a clockwise direction about pivot 112 and the link 116 will be further moved through the action of pawl 130. These successive movements may be continued until the brakes are sufficiently applied.

The link 116 will be held against backward movement by the engagement of the respective pawl members 130 and 134 with the ratchet teeth 122 and 124 thereon. When the operator desires to release the brakes, it is only necessary to operate the rod 142 in a manner to move the spring 146 as above described, whereupon by reciprocation of the lever 110, the brakes may be fully released and the slack taken up is entirely let out.

In Figures 5, 6 and 7 a still further modification is illustrated. The emergency lever 160 is rotatably supported on pivot pin 162 which is rotatably carried in a fixed boss 164 and keyed against displacement therefrom by a pin 166 engaging a groove 168 in the pin 162. Secured to the pin 162 by a key 169 and positioned between the hub 170 of lever 160 and the outer face on the bearing boss 164 is a lever arm 172 which carries a pivot pin 174 for connecting a rod 176 extending to a suitable brake operating lever. The hub 170 of lever 160 has internal ratchet teeth 178. A plurality of rollers 180 are mounted between the ratchet teeth 178 and the cylindrical surface of pin 162 and in a counter-clockwise direction of movement of lever 160 the rollers will be gripped and the pin 162 and arm 172 will move therewith. Movement of lever 160 in a clockwise direction will not tend to transmit any movement to pivot pin 162. In order to hold the lever arm 172 in the position to which it has been moved by operation of lever 160, the lever arm 172 has integrally formed thereon an enlargement 182 slidably supporting a pawl member 184 urged by spring 186 into engagement with the ratchet teeth 188 of a fixed sector 190. A ring-shaped member 192 closes the space between hub 170 of the lever 160 and the outer end 194 of pivot pin 162 and the ring member 192 carries fingers 196 which extend into the narrowed portions of the spaces between the pivot pin 162 and the ratchet teeth 178. The ring 192 also supports a plurality of spring members 198 which are positioned on the opposite sides of the rollers 180 from the fingers 196. Carried by pivot pin 200 which is fixed to the hub 170 of the lever 160 is a pivoted link 202 which has an opening 204 normally concentric with the axis of the pin 162 and receiving the end 206 of a bent rod 208, the other end 210 of which is bent to extend through a slotted opening 212 in the enlargement 182 and to engage the pawl member 184. The other arm of the pivoted link 202 has a pivot connection 214 for a release rod 216 normally movable with the lever 160. The ring 192 is also provided with a pin 218 engaging a slotted opening 220 formed in the pivot ring 202.

The initial movement of lever 160 in a counter-clockwise direction about its pivot will rotate the pin 162 whereupon the lever arm 172 will be moved to actuate the brakes through brake rod 176. If the initial movement of the lever 160 is insufficient to fully apply the brakes, it is pushed back in a clockwise direction during which movement the brake linkage will be held in partially applied position by the pawl and ratchet mechanism. The lever 160 is again moved in a counter-clockwise direction thereby producing further movement of the brake linkage. Successive movements of the lever 160 in counter-clockwise directions will finally produce full application of the wheel brakes. When it is desired to release the brakes, the rod 216 is moved in a downward direction thereby turning link 202 in a clockwise direction about the pivot pin 200 and moving the rod 208 in such a manner as to first release the pawl 184. By further movement of rod 216 the pin 218 is moved to rotate the ring 192 in a direction to force the rollers 180 out of gripping engagement between the pin 162 and the hub 170 of lever 160. The brakes are therefore allowed to fully release and the lever 160 may be returned to its normal inoperative position.

Figure 8 illustrates the manner in which the slack take-up device, illustrated in Figures 5, 6 and 7, may be associated with the power braking linkage of a motor vehicle. The usual foot pedal 230, is pivoted at 232 and connected by the pull rod 234 to the input lever arm 236 of the power brake unit, which is enclosed in casing 238. It is to be understood that the power brake unit is operative to amplify the pressure received in movement of the input lever arm through the rotation of the propeller shaft 240 and to transmit the amplified force by rotation of the output rock shaft 242 to the double arm brake lever 244. The power brake unit may have a construction such as illustrated in Rockwell, et al. Patent No. 1,896,377, issued February 7, 1933. The brake lever 244 is connected at its lower end to the forwardly extending pull rod 246 for actuation of the front wheel brakes and is connected at its upper end to the rearwardly extending pull rod 248 for operation of the rear wheel brakes. The rod 176 has attached thereto a clevis 250 having a slot 252 for receiving the pivot pin 254 carried by the brake lever 244.

It will be understood that upon normal brake actuation the pedal 230 will be depressed thereby bringing the power brake unit into action and producing clockwise rotation of the output rock shaft 242 and movement of the brake lever 244 in a direction to actuate the front and rear wheel brakes. The application of the wheel brakes from the power brake unit will not cause any movement of the rod 176 since the pin 254 will slide in the slot 252. However, if it is desired to actuate the wheel brakes by the emergency lever 160, the wheel brakes may be fully applied even though the total movement of the lever 160 in an applying direction is insufficient to fully take up the slack. Thus, counterclockwise movement of the lever 160 will partially apply the brakes and the pawl 184 engaging the ratchet teeth 188 will hold the brake linkage while the lever 160 is returned to normal position for further application of the brakes upon again moving in a counter-clockwise direction. Thus a high leverage is obtained by the hand or emergency brake control and the required travel is obtained by the back-and-forth movement.

We claim:

1. In a brake linkage, a brake actuating member, a pivoted emergency lever, means normally holding said brake actuating member against movement in a direction for release of the brakes, means operative by the emergency lever through back and forth movement thereof for moving said brake actuating member in a direction for application of the brakes and means operative from a point adjacent the handle of the emergency lever for releasing said holding means.

2. In a brake linkage, a brake actuating lever, a pivoted emergency lever and fluid pumping means operated by movement of said emergency lever for moving said brake lever in a direction to apply the brakes.

3. In a brake linkage, a brake applying lever, a pivoted emergency lever, means operative directly by said emergency lever through movement in one direction for moving said brake lever in a direction to apply the brakes and means operative by continued movement of said emergency lever in back and forth directions for further moving said brake lever in a direction to apply the brakes.

4. In a brake linkage, a brake applying lever, a pivoted emergency lever, means operative by movement of said emergency lever in one direction for directly moving said brake lever in a direction to apply the brakes and fluid pumping means operative by continued movement of said emergency lever in back and forth directions for further moving said brake lever in a direction to apply the brakes.

5. In a brake linkage, a brake applying lever, a pivoted emergency lever, a link pivotally connected to said brake applying lever, pawl and ratchet means for holding said link against movement in a direction for release of the brakes, a cylinder secured to said link, a piston in said cylinder and means operative through movement of said emergency lever for pumping fluid past the head of said piston to develop fluid pressure within said cylinder for moving said brake applying lever in a direction to apply the brakes.

6. In a brake linkage, a brake applying lever, a link pivotally connected to said brake applying lever, a cylinder carried by said link, pawl and ratchet means for holding said link against retractive movement, a piston in said cylinder, an abutment member fixed with respect to said piston and positioned adjacent the head of said cylinder, pawl and ratchet means for holding said abutment member against retractive movement, a pivoted emergency lever, means movable with said emergency lever for engaging said abutment member to move said abutment member and transmit movement to said cylinder, whereby said brake applying lever is moved in a direction for application of the brakes and means operated by continued back and forth movement of said emergency lever for developing fluid pressure beyond the head of the piston in said cylinder for moving said cylinder relative to said abutment member for further application of the brake applying lever.

7. In a brake linkage, a brake applying lever, a link pivotally connected to said brake applying lever, a cylinder secured to said link, pawl and ratchet means for holding said link against retractive movement, an abutment member adjacent the head of said cylinder, a piston head within said cylinder in fixed relation with respect to said abutment member, said cylinder having a fluid reserve chamber on one side of the piston head and a fluid pressure chamber on the other side of the piston head, a valve controlled pumping chamber in communication with said fluid reserve chamber and said fluid pressure chamber, a piston forming a movable wall of said pumping chamber, a pivoted emergency lever, a connection between the piston cooperating with the pumping chamber and a depending arm of said emergency lever, a release rod carried by said emergency lever having a projection adapted to engage said abutment member whereby movement of said emergency lever in one direction first transmits applying movement to said abutment member and to said cylinder and said emergency lever being operative by continued back and forth movement to deliver fluid from said reserve chamber to said pressure chamber, whereby said cylinder is further moved in applying direction relative to said abutment member, said release rod being movable to render the pawl and ratchet means inoperative to permit release of the brakes.

8. In a brake linkage, a brake applying lever, a pivoted emergency lever, a link pivotally connected to said brake applying lever, said link having ratchet teeth on the upper and lower sides thereof, a pair of pawl members pivotally carried by said emergency lever above and below the pivot for said emergency lever and adapted to engage the ratchet teeth on the upper and lower sides of said link, resilient means normally holding said pawls in engagement with said ratchet teeth whereby said emergency lever, through back and forth movement thereof, will move said link in an applying direction and means carried by said emergency lever for rendering the pawl members inoperative to permit the release of the brakes.

9. In a brake linkage, a brake applying lever, a pivoted emergency lever, a link pivotally connected to the brake applying lever, said link having ratchet teeth on the upper and lower sides thereof, a pair of pawl members pivotally carried by said emergency lever above and below the pivot for said emergency lever, resilient means for normally holding said pawl members in engagement with the ratchet teeth on the upper and lower sides of the link, normally inoperable resilient means and means operative from a point adjacent the handle of the emergency lever for moving said last-mentioned resilient means in a direction to oppose the effect of said first-mentioned resilient means to render said pawl members inoperable, whereby the brakes may be released.

10. In a brake linkage, a pivoted brake applying arm, a brake rod pivotally connected thereto, an emergency lever pivotally supported coaxial with the brake applying arm, a fixed sector having ratchet teeth thereon, pawl means carried by said arm for engaging the ratchet teeth on said sector to hold said brake applying arm against retractive movement and lost motion means for rotating said brake applying arm in one direction only through movement of said emergency lever.

11. In a brake linkage, a pivoted brake applying arm, a brake rod pivotally connected to said arm, a fixed sector having ratchet teeth thereon, a pawl member movably carried by said arm, resilient means for normally holding said pawl member in engagement with said ratchet teeth to prevent retractive movement of said brake applying arm, an emergency lever pivotally supported coaxial with said brake applying arm, lost motion means operative through movement of said emergency lever in one direction only for moving said brake applying arm and releasing means carried by said emergency lever for moving said pawl to inoperable position to permit release of the brakes.

12. In a brake linkage for motor vehicles, a pedal-controlled brake actuating system, an emergency lever, means connecting the emergency lever to the pedal-controlled brake system and means associated with said emergency lever for obtaining sufficient travel to fully apply the brakes through back-and-forth movements of the emergency lever.

13. In a brake linkage for motor vehicles, a power brake actuating system, a pedal for controlling the operation of the power braking system, a pivoted emergency lever, means connecting the emergency lever to the power braking system for independent control of the brakes and means for obtaining sufficient travel to fully apply the brakes through back-and-forth movement of the emergency lever.

14. In a brake system for motor vehicles, a power brake, a double arm brake lever operative from the output of said power brake and connected to the wheel brakes, a pivoted emergency lever, a link member between said emergency lever and said brake lever, said link member having a lost motion connection with said brake lever, pawl and ratchet means for holding said link member against retractive movement as it is moved in a direction to apply the brakes and means for progressively moving said link member in a direction for application of the brakes through back-and-forth movement of said emergency lever.

15. In a braking system for motor vehicles, a pedal, a power brake, means for actuating said power brake through movement of said pedal, a brake lever connected to the wheel brakes operated from the output of said power brake, a pivoted emergency lever, means connecting said emergency lever to said brake lever for operation of the wheel brakes independent of the power brake, said means being connected with a leverage sufficiently high to obtain the desired degree of braking pressure and means for obtaining sufficient travel to fully apply the brakes through back-and-forth movement of the emergency lever.

16. In a brake linkage, a brake actuating member, a pivoted hand brake lever, means normally holding said brake actuating member against movement in a direction for release of the brakes, means operative to apply the brakes upon initial movement of the hand lever in one direction and means operative to further apply the brakes upon return movement of the hand lever in the opposite direction.

17. In a brake linkage, a brake actuating member, a cylinder connected to said brake actuating member, a piston head in said cylinder, a hand brake lever and fluid pumping means operative through movement of said hand brake lever to build up fluid pressure between said cylinder and said piston head to produce movement of said brake actuating member.

18. In a brake linkage, a brake actuating member, a brake applying lever, means normally effective to hold said brake actuating member against movement in a direction for release of the brake, means operated by the brake applying lever through movement in different directions thereof for moving said brake actuating member in a direction for application of the brake and means for disabling said holding means to permit release of the brake.

EDWIN R. EVANS.
EDWARD A. ROCKWELL.